Patented Nov. 18, 1952

2,618,557

UNITED STATES PATENT OFFICE 2,618,557

METHOD OF DEVELOPING SENSITIVE PHOTOGRAPHIC MATERIALS

Edward B. Knott, Wealdstone, England, assignor to Eastman Kodak Company, Rochester, N. Y., a corporation of New Jersey No Drawing. Application August 6, 1948, Serial No. 43,009. In Great Britain August 26, 1947

2 Claims. (Cl. 95—88)

This invention relates to sensitive photographic material more particularly sensitive photographic material comprising a light sensitive silver salt emulsion.

Sensitive silver salt emulsions which form latent image mostly inside the grains are known (see Knott and Stevens application U. S. Serial No. 528,739, now abandoned, of which U. S. Patent 2,456,953 is a continuation-in-part and Davey and Knott U. S. application Serial No. 790,232, now abandoned, of which application Serial No. 82,914 is a continuation-in-part). In those prior specifications, these emulsions are referred to as Type I.

I have observed that some Type I emulsions (i. e. emulsions which form latent image mostly inside the grains) may, when well exposed to light, give an undesirable ghost image when treated with a surface developer such as Developer Formula III as given in Knott and Stevens U. S. Patent 2,456,953.

One object of the present invention is to provide a method of reducing or eliminating the tendency for a ghost image to develop in sensitive silver halide emulsions of the kind which form latent image inside the grains and substantially no latent image on the surface of the grains, when such emulsions are well exposed to light and treated with surface developers.

Another object of the present invention is to provide a mixture of a sensitive silver halide emulsion which forms latent image inside the grains and substantially no latent image on the surface of the grains and another emulsion of lower sensitivity, which mixture gives no ghost image when well exposed to light and treated with a surface developer.

Another object of the present invention is to provide a sensitive silver halide emulsion layer containing at least 85% calculated on the silver content of an emulsion which forms latent image inside the grains and substantially no visible image when well exposed to light and treated in a surface developer especially when performing the reversal process described in Knott and Stevens U. S. Patent 2,456,953.

Other objects of the present invention will be apparent from what follows.

I have now found that such undesirable ghost image may be greatly reduced or eliminated by mixing with the emulsion before coating, a considerably less sensitive silver salt emulsion, preferably an emulsion of the kind which forms surface latent image to a very appreciable extent.

I am aware that in U. S. specification Serial No. 528,738, now abandoned, of which U. S. Patent 2,456,956 is a continuation-in-part there is described the method of mixing Type I and II emulsions, as theredefined, but in the present invention the emulsion which is mixed with the Type I emulsion should have not only a relatively very low sensitivity but should only be employed in a low proportion, say up to 15% as otherwise loss of density of the image produced in the Type I emulsion becomes serious.

It is desirable to use a Type I emulsion which gives as little as possible surface latent image, for instance an emulsion made as described in Davey and Knott application U. S. Serial No. 790,232, now abandoned, of which application Serial No. 82,914 is a continuation-in-part. For the less sensitive emulsion to be mixed therewith it is preferred to employ a Type II emulsion as defined in Knott and Stevens Patent 2,456,956, especially a silver chloride emulsion, although a silver bromide emulsion will give good results if the soluble bromide is washed out either before or after the emulsion is added to the Type I emulsion.

Although the proportion of the amount of the less sensitive emulsion to the amount of the Type I emulsion is not critical, it is desirable to use as little of the less sensitive emulsion as is convenient in order to avoid too serious a reduction in density in the final image obtained in the Type I emulsion, when the mixture is coated as a layer and exposed to an image and developed for instance as described in the aforesaid Patent 2,456,953. For instance to an amount of emulsion containing the equivalent of 100 grams of silver nitrate there may be added an amount of the second emulsion, containing the equivalent of 1 to 15 grams, for instance, 5 to 10 grams of silver nitrate.

In order to measure the relative sensitivities of the emulsions for the purpose of the present invention, portions of the emulsions are coated separately as layers. For convenience they can be coated at the same thickness or at the same rate of silver content per square centimetre but in any case the coating weight is not critical for the purpose of making the particular sensitivity comparison measurements as required for the present invention. These emulsion layers are both exposed to the amount of light just necessary to give substantially maximum density in the Type I emulsion layer when it is developed for 4 minutes at 20° C. in the following "internal" developer (II) b.

| | Grams |
|---|---|
| Hydroquinone | 12 |
| N-methyl-p-aminophenol sulphate | 3 |
| Sodium sulphite, crystals | 90 |
| Potassium bromide | 4 |
| Sodium carbonate, crystals | 150 |
| Sodium thiosulphate, crystals | 20 |
| Water to 1000 ccs. | |

Whether the less sensitive additional emulsion is one which forms considerable surface latent image, for instance a Type II emulsion (as defined in Knott and Stevens U. S. Patent 2,456,956, or is a Type I emulsion, the layer of said additional emulsion treated for 4 minutes at 20° C. in the following developer III.

| | Grams |
|---|---|
| Hydroquinone | 12 |
| N-methyl-p-aminophenol sulphate | 3 |
| Sodium sulphite crystals | 90 |
| Potassium bromide | 4 |
| Sodium carbonate, crystals | 150 |
| Water to 1 litre. | | and if the aforesaid exposure is insufficient to produce any appreciable visible image (i. e. density above fog), then the emulsion has a sufficiently low sensitivity for use in admixture with the more sensitive Type I emulsion.

The following examples illustrate sentitive materials made in accordance with the invention.

Example 1

A fast Type I emulsion was made as described in the example given in Davey and Knott application U. S. Serial No. 790,232, now abandoned, of which application Serial No. 82,914 is a continuation-in-part. To 3500 ccs. of this fast Type I emulsion, there was added 500 ccs. of a Type II fine-grained slow silver chloride emulsion made as follows:

| | | |
|---|---|---|
| A. Gelatine | 40 grams | at 30° C. |
| Water | 2000 ccs. | |
| B. KCl | 87 grams | at 20° C. |
| Water to | 1000 ccs. | |
| C. AgNO₃ | 200 grams | at 20° C. |
| Water to | 1000 ccs. | |

Run B and C simultaneously and slowly into A with the usual stirring and then keep at 30° C. for about one minute. Then add a solution of 300 grams of gelatine in 1500 ccs. of water, keep the mixture for 2 minutes at 30° C., set and wash in the usual way. Add about 150 ccs. of 10% KCl (by weight) and then add water to make 10 litres. This mixed emulsion forms mostly surface latent image.

The mixture made according to this example contained an amount of the fast Type I emulsion equivalent to 195 grams of AgNO₃ and an amount of the slow silver chloride emulsion equivalent to about 10 grams of AgNO₃ i. e., in the proportion of 100 to about 5. This mixture, when coated as a layer and well exposed, showed a marked reduction of ghost image on treatment with an ordinary commercial M. Q. developer, compared with the Type I emulsion by itself.

Example II

To 3,500 ccs. of the same fast Type I emulsion as used in Example 1, there was added 500 ccs. of a fine grained slow silver bromide emulsion made as follows:

| | | |
|---|---|---|
| A. Inert gelatine | 230 grams | at 30° C. |
| KBr | 2 grams | |
| Water to | 2000 ccs. | |
| B. AgNO₃ | 200 grams | at 30° C. |
| Water to | 1000 ccs. | |
| C. KBr | 145 grams | at 30° C. |
| Water to | 750 ccs. | |

Run B and C simultaneously and very slowly into A with the usual stirring. Keep the mixture at 30° C. for about 5 minutes, then add a solution of 250 grams of inert gelatine in 1000 ccs. of water. Then hold the mixture at 30° C. for 10 minutes, set and wash in the usual manner. Then add 150 ccs. of 10% KCl (by weight) and add water to make 5 litres. This mixed emulsion forms internal and surface latent image.

The mixture made according to this example contained an amount of the fast Type I emulsion equivalent to 195 grams of AgNO₃ and an amount of the slow emulsion equivalent to about 20 grams, i. e., in the proportion of 100 to about 10¼. This mixture when coated as a layer and well exposed, showed a marked reduction of ghost image on treatment with an ordinary commercial M. Q. developer, compared with the Type I emulsion by itself.

Although I have described the invention as applied to a single Type I emulsion used for photographic layer, it is of course possible to mix in the same layer one or more further Type I emulsions in which case, the various Type I emulsions of the mixture can have differential colour sensitivities in the manner commonly necessary for making multi-emulsion sensitive photographic materials for multi-colour photography.

What I claim and desire to secure by Letters Patent of the United States is:

1. The method of reducing or eliminating the tendency for a surface developer to produce a visible image in a silver halide emulsion (I) a test portion of which upon exposure to a light intensity scale for a fixed time between 1/100 and 1 second and development for 3 minutes at 20° C. in the following internal type developer:

| | Grams |
|---|---|
| Hydroquinone | 15 |
| N-methyl-p-aminophenol sulphate | 15 |
| Anhydrous sodium sulphite | 50 |
| Potassium bromide | 10 |
| Sodium hydroxide | 25 |
| Sodium thiosulphate | 20 |
| Water to 1 litre. | | gives a maximum density at least 5 times the maximum density obtained when the equally exposed silver halide emulsion (I) is developed for 4 minutes at 20° C. in the following surface developer (I):

| | Grams |
|---|---|
| p-Hydroxyphenylglycine | 10 |
| Sodium carbonate | 100 |
| Water to 1 litre. | | which comprises mixing with such emulsion (I) before coating and exposure from 1% to 15% of the amount of emulsion (I) of a silver halide emulsion (II) a test portion of which upon exposure to light and development for 4 minutes at 20° C. in the following developer (IIb):

|  | Grams |
|---|---|
| Hydroquinone | 12 |
| N-methyl-p-aminophenol sulphate | 3 |
| Sodium sulphite, crystals | 90 |
| Potassium bromide | 4 |
| Sodium carbonate, crystals | 150 |
| Sodium thiosulphate, crystals | 20 |
| Water to 1 litre. | | gives a density along the $\log_{10}E$ axis of the characteristic curve which does not exceed the density at the same point along the $\log_{10}E$ axis obtained when an identical test portion of the light-sensitive silver halide emulsion (II) is exposed and developed for 4 minutes at 20° C. in the following developer (III):

|  | Grams |
|---|---|
| Hydroquinone | 12 |
| N-methyl-p-aminophenol sulphate | 3 |
| Sodium sulphite, crystals | 90 |
| Potassium bromide | 4 |
| Sodium carbonate, crystals | 150 |
| Water to 1 litre. | | the relative speed of the two emulsions (I) and (II) being such that when both emulsions are exposed to the amount of light necessary to produce substantially maximum density in the first above mentioned emulsion (I) upon development for 4 mins. at 20° C. in developer II(b) given above, the other emulsion (II) gives substantially no visible image when treated for 4 mins. at 20° C. in the developer III given above, exposing the mixed emulsion to a lighted object or image, uniformly fogging the emulsion layer to produce latent image some of which is developable by the aforesaid developer (III), and developing the mixed emulsion in a developer which develops in the originally unexposed parts of the layer the latent image which is developable by said developer (III), but which produces no visible image in the originally exposed parts of the layer.

2. The method according to claim 1 in which the less sensitive emulsion (II) is a silver chloride emulsion.

EDWARD B. KNOTT.

REFERENCES CITED

The following references are of record in the file of this patent:

UNITED STATES PATENTS

| Number | Name | Date |
|---|---|---|
| 2,456,956 | Knott et al. | Dec. 21, 1948 |

OTHER REFERENCES

Wall: "Photographic Emulsions," Publ. 1929 by American Phot. Publ. Co., Boston, pages 37, 38 and 135–137.

Eder: Handbuch Der Photographie, vol. III, 1, 1902, Die Grundlage der Photographie Mit Gelatine Emulsion; pages 117–124, 204 and 205.